Aug. 28, 1962  H. GALMAN  3,051,942
SYNCHRONOUS POSITIONING SYSTEM
Filed April 28, 1959  2 Sheets-Sheet 1

INVENTOR.
HERBERT GALMAN
BY
ATTORNEY

Aug. 28, 1962 H. GALMAN 3,051,942
SYNCHRONOUS POSITIONING SYSTEM
Filed April 28, 1959 2 Sheets-Sheet 2

INVENTOR.
HERBERT GALMAN
BY
ATTORNEY

United States Patent Office 3,051,942
Patented Aug. 28, 1962

3,051,942
SYNCHRONOUS POSITIONING SYSTEM
Herbert Galman, Pasadena, Calif., assignor to United Aircraft Corporation, East Hartford, Conn., a corporation of Delaware
Filed Apr. 28, 1959, Ser. No. 809,458
14 Claims. (Cl. 340—347)

My invention relates to a synchronous positioning system and more particularly to an improved synchronous positioning system which is directly responsive to the binary representations of the digits of a number representing a position.

In automatic positioning systems of the type known in the prior art, an input member is positioned to produce an electrical analogue signal representing the position to which it is desired to drive the output member of the system. This analogue signal is compared with a signal which is the analogue of the position of the output member to produce an error signal which is employed to drive the output member to the desired position.

In recent computing and control systems, positions are often represented by binary coded digital position signals. It is often necessary that a member, such as a shaft or the like, be located at the position represented by an input signal of this nature.

I have invented a synchronous positioning system which is directly responsive to the binary representations of a digital input position number. My system is responsive to the most significant digit of the input position number to drive the output member to within a position range corresponding to the most significant digit. In response to the digits of a lesser significance of the input position number, my system drives the output member to the precise location within the range corresponding to the most significant digit. My system accomplishes this result electrically without requiring separate mechanical inputs for any of the respective digits of the digital input number.

One object of my invention is to provide a synchronous positioning system which accurately positions an output member in response to the binary representations of the digital input position number.

Another object of my invention is to provide a synchronous positioning system which responds to the representation of the most significant input digit to position the output member within a certain position range and which responds to the binary representations of the digits of lesser significance to position the output member accurately within the certain position range.

A further object of my invention is to provide a synchronous positioning system which positions an output member in response to a binary-coded digital input signal without requiring separate mechanical inputs for any of the respective digits of the input position number.

Other and further objects of my invention will appear from the following description:

In general my invention contemplates the provision of a synchronous positioning system including a synchronous device having a rotor and having a stator with a plurality of windings, each winding and phase of which stator corresponds to a certain position range. I provide logic circuitry responsive to the binary representation of the most significant digit of an input position number for selecting a stator winding and phase corresponding to the position range representing the most significant digit of the input position number. A digital-to-analogue converter responsive to the binary representations of the lesser significant position number digits produces an output signal which is the analogue of the number represented by the digits of lesser significance. I compare the converter output with the output of the selected winding and phase voltage to produce an error signal for energizing a motor to drive the rotor to a location within the selected range corresponding to the digital input position number.

In the accompanying drawings which form part of the instant specification and which are to be read in conjunction therewith and in which like reference numerals are used to indicate like parts in the various views.

Figure 1:
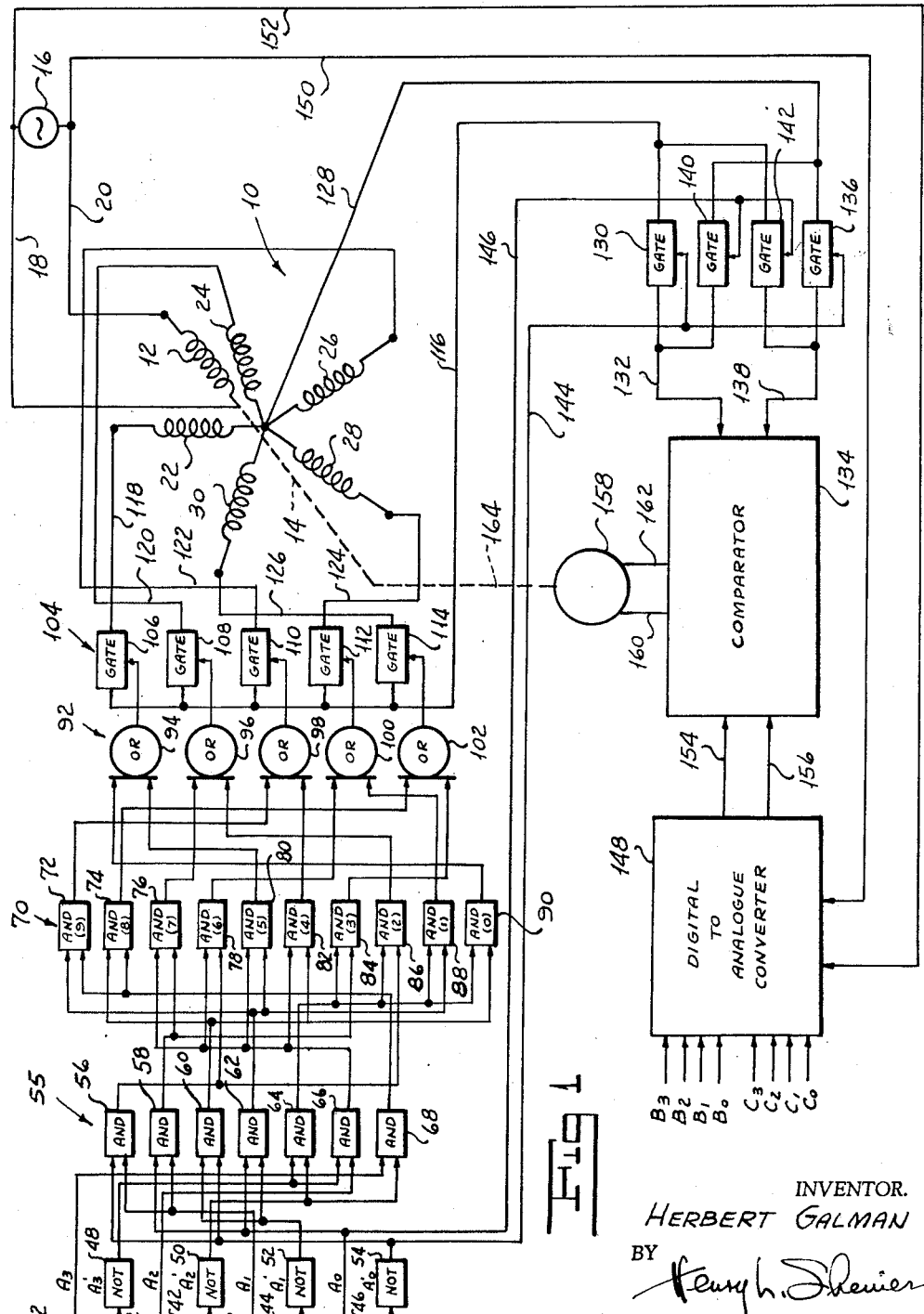
FIGURE 1 is a schematic view of my synchronous positioning system.

Referring now more particularly to the drawings, my synchronous positioning system includes a synchronous device indicated generally by the reference character 10 having a rotor carried by a shaft 14 indicated by a broken line in FIGURE 1. I energize the rotor winding 12 from a suitable source 16 of energy connected across the rotor winding by respective conductors 18 and 20.

The stator of the device 10 carries a plurality of respective windings which, in the particular embodiment shown, are five respective windings 22, 24, 26, 28, and 30. As the shaft 14 turns through a single revolution, the field produced by the energized winding 12 induces respective voltages in the stator windings. The magnitude of each voltage varies through a complete cycle in the course of each revolution of the rotor shaft 14. For purposes of clarity, I have designated the respective windings 22, 24, 26, 28, and 30 in FIGURE 3 as A, B, C, D, and E and have labeled the corresponding curves representing the variations in induced voltage of these windings with shaft position as a, b, c, d, and e in FIGURE 2. By proper design of the stator teeth and distribution of the stator windings, the output voltages of the respective windings are modified in the regions adjacent to zero output of each winding to produce a linear variation of the output voltage with angular rotation of the rotor shaft 14, in a manner which is well known in the art.

It will be appreciated from the description of the synchronous device 10 given hereinabove that ten respective ranges of voltage variation, each corresponding to a particular stator winding and phase, are provided by the device. Each one of these ranges covers 36° of rotation of shaft 14. It will be understood further that I may arrange my system to provide a predetermined voltage variation over each of the ranges provided. For example, I may select the voltage variation to be from −10 volts to +10 volts. With this arrangement, providing a 20 volt range of variation for each position range, each two-tenths of a volt can be said to represent one unit of position with the result that one hundred units of position are provided in each position range. Thus the selection of a particular stator winding and phase represents the most significant digit of a position number while the particular voltage within the voltage range of the position range corresponding to the most significant digit may represent two digits of lesser significance. Thus any three-decimal digit number corresponds to the selection of a particular winding and phase and to a particular voltage within that position range.

Figure 2:
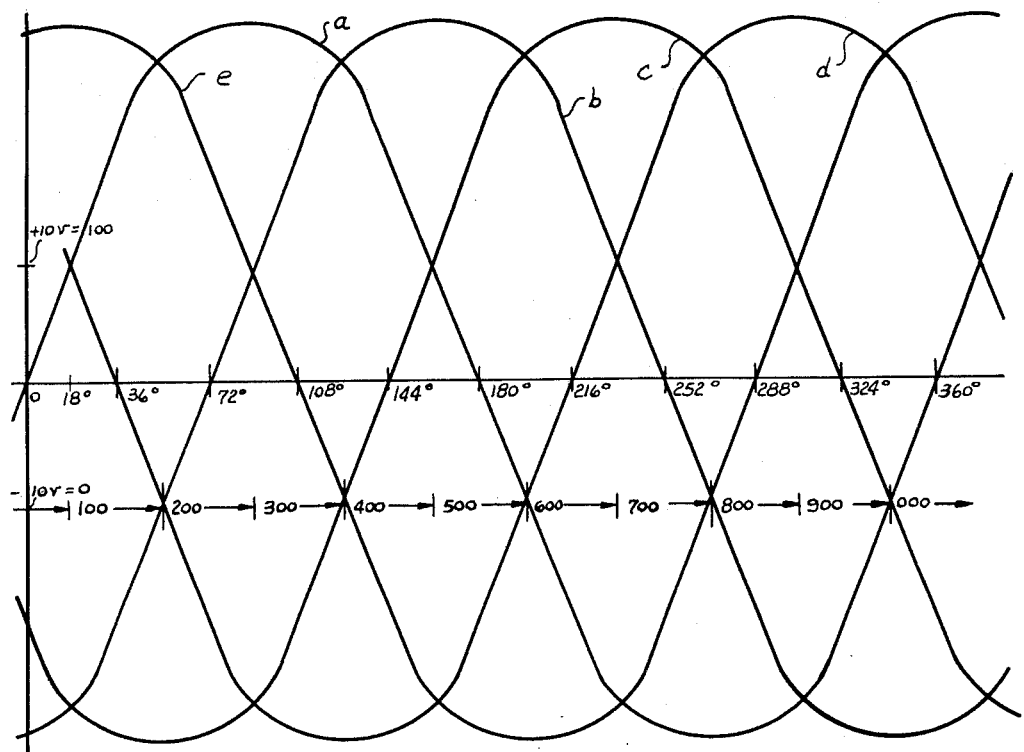
FIGURE 2 is a plot showing the variation in the stator-winding induced voltages of my synchronous positioning system as the rotor moves through one revolution.
Figure 3:
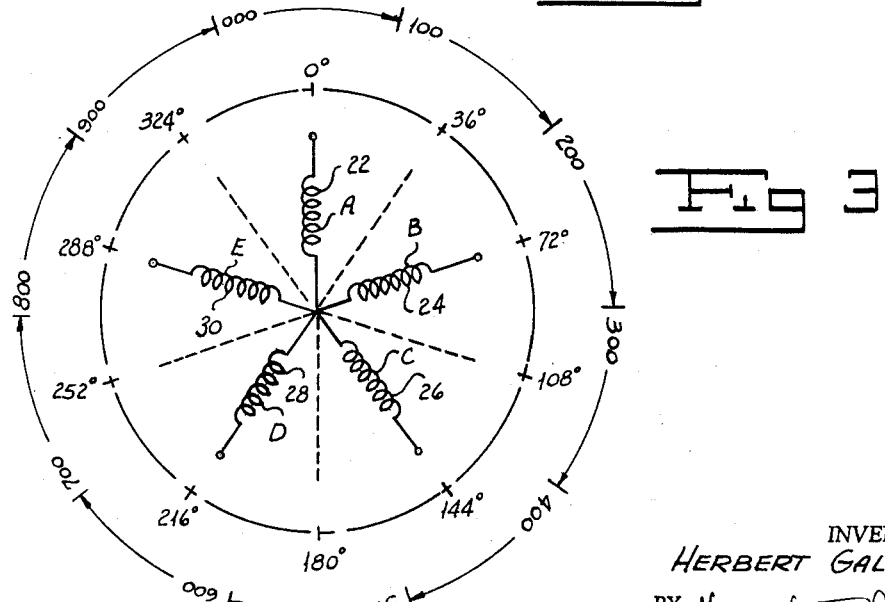
FIGURE 3 is a diagrammatic view showing the relationship between the most significant digits of the input position member and the respective stator windings of my synchronous positioning device.

As can be seen by reference to FIGURES 2 and 3, I have arranged my system so that the winding A corresponds to the position range from 000 to 099, the reversed phase of winding D represents the range from 100 to 199, the winding B represents the position range from 200 to 299, the reversed phase of winding E represents the position range from 300 to 399, and so forth.

The digital input position number to which the shaft 14 is to be positioned may be represented in binary-coded decimal form by the groups of bits $A_3A_2A_1A_0$, $B_3B_2B_1B_0$, and $C_3C_2C_1C_0$. I provide my system with means responsive to the bits and complements of the most significant digit of the input position number for selecting a winding and phase corresponding to the most significant digit. I apply the respective bits of the representation of the most significant input digit to respective terminals 32, 34, 36, and 38. Respective conductors 40, 42, 44, and 46 connect the terminals 32, 34, 36 and 38 to the input terminals of a plurality of NOT logic circuit components 48, 50, 52, and 54 to cause these components to produce the respective complements $A_3'A_2'A_1'A_0'$ of the most significant digit input bits. I apply the respective bits and complements to a group indicated generally by the reference character 55 of two-input-AND circuits 56, 58, 60, 62, 64, 66, and 68 in a predetermined manner, and I apply the output signals from the group 55 of two-input-AND circuits to a group indicated generally by the reference character 70 of two-input-AND circuits 72, 74, 76, 78, 80, 82, 84, 86, 88, and 90 in a predetermined manner to cause one of the two-input-AND circuits of the group 70 to be energized. The respective components of the group 70 correspond to the respective digits of from 0 to 9.

The operation of the logic circuitry described above can best be understood by considering a particular example. Let us assume that the most significant digit of the input position number is, for example, 5, represented by the group of bits 0101, the complement of which is represented by the group of complements 1010. With these inputs to the components of the group 55, each of the components 62, and 66 produces an output while none of the other components produce outputs. Following through the system, the component 80 of the group 70, which is fed by the components 60 and 66, produces an output while none of the other components of this group 70 produce outputs. It will thus be seen that with a binary-coded decimal input representing a 5 being applied to the terminals 32, 34, 36, and 38 the AND circuit 80 corresponding to the digit 5 produces an output signal. The other AND circuits of the group 70 are activated in an analogous manner to produce output signals in response to the representations of other digits. I have indicated the circuits activated in response to other representations by placing the digits in parentheses in the boxes indicating the AND circuits of the group 70 in FIGURE 1.

I connect the output terminals of the components of group 70 to predetermined ones of a group indicated generally by the reference character 92 of two-input-OR circuits 94, 96, 98, 100, and 102. As is known in the art, a component of the group 92 produces an output signal in response to an input signal applied to one or the other of its input terminals. I connect the output terminals of the respective components of the group 92 to the control input terminals of a group indicated generally by the reference character 104 of normally nonconducting gating circuits 106, 108, 110, 112, and 114. In response to the application of a signal to the control input terminal of one of the gating circuits 106, 108, 110, 112, and 114, the circuit connects a common conductor 116, connected to the input terminals of all gating circuits, to one of a number of conductors 118, 120, 122, 124, and 126 connected between the output terminals of the respective gating circuits of group 104 and the output terminals of windings 22, 24, 26, 28, and 30 of the synchronous device 10. The other terminals of the stator windings of the device 10 are connected to a common conductor 128.

To explain the operation of the group of components 92 and the group 104 of gating circuits, let us again consider that the representation of a most significant digit, which is 5, is applied to the terminals 32, 34, 36, 38. As can be seen by reference to FIGURE 3, with this most significant input digit, the reverse phase of winding 22 should be selected. As has been explained hereinabove, with this input digit, the component 80 of the group 70 produces an output signal. This output signal passes through the OR circuit 94 to cause gating circuit 106 to connect conductor 116 to conductor 118. A circuit is then complete from conductor 116 through the circuit 106 through conductor 118 and through winding 22 to the common conductor 128. Thus the correct winding for the input digit 5 has been selected.

I connect the conductor 116 to the input terminal of a normally nonconducting gating circuit 130, the output terminal of which I connect to one input conductor 132 of a comparator 134. I connect conductor 128 to the input terminal of a normally nonconducting gating circuit 136, the output terminal of which I connect to the other input conductor 138 of the comparator 134. A normally nonconducting gating circuit 140 connects input conductor 132 to conductor 128. A normally nonconducting gating circuit 142 connects the input conductor 138 to conductor 116.

From FIGURE 3 it will be apparent that each time the most significant digit of the input position number is odd, I must reverse the phase of the selected winding. As is known in the art, the least significant bit of the representation of an odd number is in all cases a "1" in the binary code. A conductor 144 applies the complement of the least significant bit of the input representation to the control input terminals of gating circuits 130 and 136. A conductor 146 applies the least significant bit of the representation of the most significant digit of the input to the control input terminals of the gating circuits 140 and 142. It will be appreciated that when the most significant input digit is even so that the complement of its input representation is a "1," both gating circuits 130 and 136 are rendered conductive with the result that the voltage from the selected stator winding of the device 10 is applied to the comparator 134 with no phase reversal. Similarly if the most significant input digit is odd such that the least significant bit of its representation is a "1" in the binary code, gating circuits 140 and 142 are rendered conductive with the result that the voltage output of the selected winding is applied to the comparator with reversed phase.

The comparator 134 may be of any suitable type known to the art, such as an amplifier or the like, which is adapted to compare two analogue voltages applied thereto to produce an output signal representing the difference between the applied voltages. In my system, I employ this comparator to compare the correct phase of the output voltage of the selected stator winding with the analogue voltage representing the digits of lesser significance of the input position number. My system includes a digital-to-analogue converter 148 for producing an output voltage which is the analogue of the digits of lesser significance of the input position number. In the particular form of my system shown, where the input position number is a decimal number having three significant places, I apply the group of bits $B_3B_2B_1B_0$ representing the next to least significant digit and the group of bits $C_3C_2C_1C_0$ representing the least significant digit to the input terminals of converter 148. Respective conductors 150 and 152 apply the voltage from source 16 to the converter 148 to provide the converter with the same reference voltage as that which is applied to the rotor winding 12 of the device 10. Converter 148 may be of any suitable type known to the art such, for example, as the Digital-to-Analogue Converter disclosed in the copending application of Jack Gilbert, Serial No. 699,597, filed November 29, 1957. As is explained in the copending application, in response to groups of binary bits fed to its input terminals, the converter 148 produces an analogue output signal on its output conductors 154 and 156.

I connect a motor 158 to the output conductors 160 and 162 of comparator 134. In response to an error signal on conductors 160 and 162, motor 158 is energized to drive the shaft 14 of the device 10 through a mechanical linkage indicated by the broken line 164.

The operation of my synchronous positioning system is best understood by considering a particular example. Let us assume that the shaft 14 is to be positioned at the number 256 position and that there are available from a computing device or the like (not shown) the binary-coded decimal representations of the digits of the number 256. Let us assume also that the present position of the rotor is position number 600, which corresponds to 198° of displacement from the zero position.

I first apply the binary-coded decimal representation of the digit 2 to the terminals 32, 34, 36, and 38. When this is done, the components 56 and 64 and only these components of the group 55 produce output signals. These output signals from components 56 and 64 of group 55 are applied to the component 86 of the group 70 to produce an output signal which passes through the circuit 96 to render gating circuit 108 conductive. No other components of the group 70 produce outputs in this time. As a result of this operation, a circuit is complete from conductor 116 through circuit 108, through conductor 120 and through winding 24 to the conductor 128. Thus the correct winding 24 is selected for the most significant digit 2.

With the representation of 2 applied to the logic circuit input terminals, the complement of the least significant bit is a "1" in the binary code with the result that gating circuits 130 and 136 are rendered conductive to apply the output voltage of winding 24 to the input conductors 132 and 138 with no phase reversal.

Assuming that the shaft 14 is initially in the number 600 position, it can be seen by reference to the curve b shown in FIGURE 2 that winding 24 produces a large output signal of a positive polarity. I so set up my device 10 that a signal of this polarity energizes the motor 158 to drive the rotor shaft 14 to the left, as viewed in FIGURE 2, or counterclockwise, as viewed in FIGURE 3, toward a null position.

The representations of the digits of lesser significance fed to the input terminals of the converter 148 produce an output signal which is the analogue of the number 56 represented by the next-to-least and least significant digits of the input position number. Assuming the system has a voltage range of 20 volts from −10 to +10 volts, the output analogue representing the number 56 is +1.2 volts. The error signal from comparator 158 continues to drive the rotor toward the point of balance until the output voltage of winding 24 is equal to +1.2 volts at which time the rotor shaft 14 is precisely located at the number 256 position. The operation of my system in locating the rotor shaft 14 in any other position from 000 to 999 may be understood by following the system through in a manner similar to that outlined hereinabove.

While I have shown and described my system as being used in connection with a decimal number system, it is to be understood that my system may also be used with other number systems. For example, if two or four stator coils or windings are provided a quaternary system can be used. With three windings, a sexenary system can be used. It is to be understood further that while only a three-digit number is used in the system shown either a two-digit number or a number having more than three digits may be employed.

A particular advantage of my system is that, while the input of the system is digital, due to the analogue nature of the output corresponding to the two least significant digits, a number of devices 10 can be connected in cascade to extend indefinitely the total number of digits handled by the system.

It will be seen that I have accomplished the objects of my invention. I have provided a synchronous positioning system for accurately positioning a member in response to a digital input. My system accomplishes this result by positioning the member within a range in accordance with the most significant digit of the input number and by positioning the member within the range in accordance with the digits of lesser significance. My system accomplishes this result electrically without requiring separate mechanical inputs for any of the perspective digits of the digital positon number.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A synchronous system for positioning a shaft in accordance with a binary-coded number representative of a position including in combination a synchronous device having a rotor winding carried by said shaft and a plurality of stator windings, means for energizing said rotor winding to induce respective voltages in said stator windings, a comparator, means responsive to a representation of the most significant digit of said coded number for coupling a voltage of a certain phase generated in a particular one of said stator windings to the comparator, means responsive to representations of the less significant digits of said coded number for producing an analogue signal, means for coupling the analogue signal to said comparator to cause the comparator to produce an error signal and means responsive to said error signal for driving gsaid shaft to the position represented by said coded number.

2. A synchronous system as in claim 1 in which said means for coupling said stator voltage comprises a logic network responsive to the representation of the most significant digit for connecting said particular winding to said comparator.

3. A synchronous system as in claim 1 in which the representation of the most significant digit comprises a least significant bit and complement thereof and in which said means for coupling said stator voltage comprises a logic network for connecting said particular winding to said comparator and switching means responsive to the least significant bit and switching means responsive to said complement for determining the phase of said stator winding voltage applied to said comparator.

4. A synchronous system for positioning a shaft in accordance with a binary-coded number representative of position including in combination a synchronous device having a rotor winding carried by said shaft and a plurality of stator windings, a source of alternating potential, means for energizing said rotor winding from said source to induce respective voltages in said stator windings, a comparator, a logic network responsive to a representation of the most significant digit of said coded number for connecting a particular stator winding to said comparator, said representation comprising a least significant bit and complement thereof, switching means responsive to said least significant bit and switching means responsive to said complement for determining the phase of said particular winding voltage connected to said comparator, means responsive to the representations of the digits of lesser significance of said coded number for producing an analogue signal, means for applying said analogue signal to said comparator to cause the comparator to produce an error signal and means responsive to said error signal for driving said shaft to the position represented by said position number.

5. A synchronous system as in claim 4 in which said means responsive to the representations of said less significant digits comprises a digital-to-analogue converter and means for connecting said source to said converter.

6. A synchronous system for positioning a shaft in accordance with a binary-coded decimal number representative of position including in combination a synchronous device having a rotor winding and five spaced stator windings, said rotor winding being adapted to be energized by an alternating potential to induce respective voltages in said stator windings, means for connecting said stator windings to provide for ten voltages corresponding to ten position ranges of said rotor; a comparator, means including said connecting means responsive to a representation of the most significant digit of said decimal number for coupling a voltage corresponding to a certain position range to said comparator, means responsive to representations of the less significant digits of said decimal number for producing an analogue signal representing a particular position within said certain position range, means for coupling said analogue signal to said comparator to cause the comparator to produce an error signal and means responsive to said error signal for driving said shaft to said particular position.

7. A synchronous system for positioning a member in accordance with a binary-coded number representative of a position including in combination means responsive to the position of said member for producing respective phase displaced voltages, means for comparing a par of voltages applied thereto to produce an output signal, means responsive to a representation of the most significant digit of said coded number for coupling a particular one of said phase displaced voltages to said comparing means, means responsive to the representations of the digits of less significance of said coded number for producing an anologue signal, means for coupling the analogue signal to said comparing means to cause the comparing means to produce an output error signal.

8. A synchronous positioning system including in combination a device having a stator and a rotor, the device providing an output varying as a continuous function of rotor movement relative to a null rotor position, the stator being provided with a plurality of circuits adapted to be selectively enabled and disabled, means for selectively providing first representations of digits of a certain significance, means for selectively enabling and disabling the stator circuits in response to the first representations, the selective enabling and disabling of the stator circuits shifting the null rotor position by discrete increments, means for providing a second representation of a digit of a lesser significance, means for providing an analog signal in accord with the second representation, and means responsive both to the output of the device and to the analog signal for controlling movement of the rotor.

9. A synchronous positioning system including in combination a device having a stator and a rotor, a source of input excitation voltage for the device, the device providing an output varying as a continuous function of rotor movement relative to a null rotor position, the stator being provided with a plurality of circuits adapted to be selectively enabled and disabled, means for selectively providing first representations of digits of a certain significance, means responsive to the first representations for selectively enabling and disabling the stator circuits, the selective enabling and disabling of the stator circuits shifting the null rotor position in discrete increments, means for providing a second representation of a digit of a lesser significance, means including the input excitation voltage source for providing an analog signal in accord with the second representation, and means responsive both to the output of the device and to the analog signal for controlling movement of the rotor.

10. A synchronous positioning system including in combination a device having a rotor and a stator, the device providing an output signal varying continuously in amplitude and varying in polarity with rotor movement from a null output signal position, the stator being provided with a plurality of circuits adapted to be selectively enabled and disabled, means for selectively providing first representations of digits of a certain significance, means responsive to the first representations for selectively enabling and disabling the stator circuits, the selective enabling and disabling of the stator circuits shifting the null output signal position in discrete increments, means for selectively providing second representations of digits of a lesser significance, means responsive to the second representations for selectively providing analog signals of varying polarities, and means responsive both to the output signal and to the analog signal for controlling movement of the rotor.

11. A synchronous positioning system including in combination a magnetic-coupling device having a rotor and having a stator provided with a plurality of space-displaced windings, the device providing an output varying with rotor movement, means for selectively providing first representations of digits of a certain significance, means for selectively enabling and disabling the stator windings in response to the first representations, means for providing a second representation of a digit of a lesser significance, means for providing an analog signal in accord with the second representation, and means responsive both to the output of the device and to the analog signal for controlling movement of the rotor.

12. A synchronous positioning system as in claim 11 which further includes means responsive to the first representations for governing the polarity of the enabling of the stator windings.

13. A synchronous positioning system as in claim 11 which further includes means responsive to the first representations for governing the polarity of the output of the device.

14. In a synchronous positioning system, a transducer including a rotor provided with a winding and a stator provided with five windings equally spaced by 72°, the rotor and stator being magnetically coupled to provide ten null positions equally spaced by 36° at each of which the magnetic coupling between the rotor winding and a stator winding is zero, and the transducer being so constructed that the magnetic coupling varies substantially linearly within a region of 18° on either side of each null position.

References Cited in the file of this patent

UNITED STATES PATENTS

| | | |
|---|---|---|
| 2,840,771 | Kamm | June 24, 1958 |
| 2,853,699 | O'Neil | Sept. 23, 1958 |
| 2,927,258 | Lippel | Mar. 1, 1960 |

UNITED STATES PATENT OFFICE
CERTIFICATE OF CORRECTION

Patent No. 3,051,942                                                        August 28, 1962

Herbert Galman

It is hereby certified that error appears in the above numbered patent requiring correction and that the said Letters Patent should read as corrected below.

Column 6, lines 39 to 40 for "drivin gsaid" read -- driving said --; column 7, line 33, for "par" read -- pair --; line 39, for "anologue" read -- analogue --.

Signed and sealed this 11th day of December 1962.

(SEAL)
Attest:

ERNEST W. SWIDER                                       DAVID L. LADD
Attesting Officer                                          Commissioner of Patents